United States Patent Office 3,283,257
Patented Nov. 1, 1966

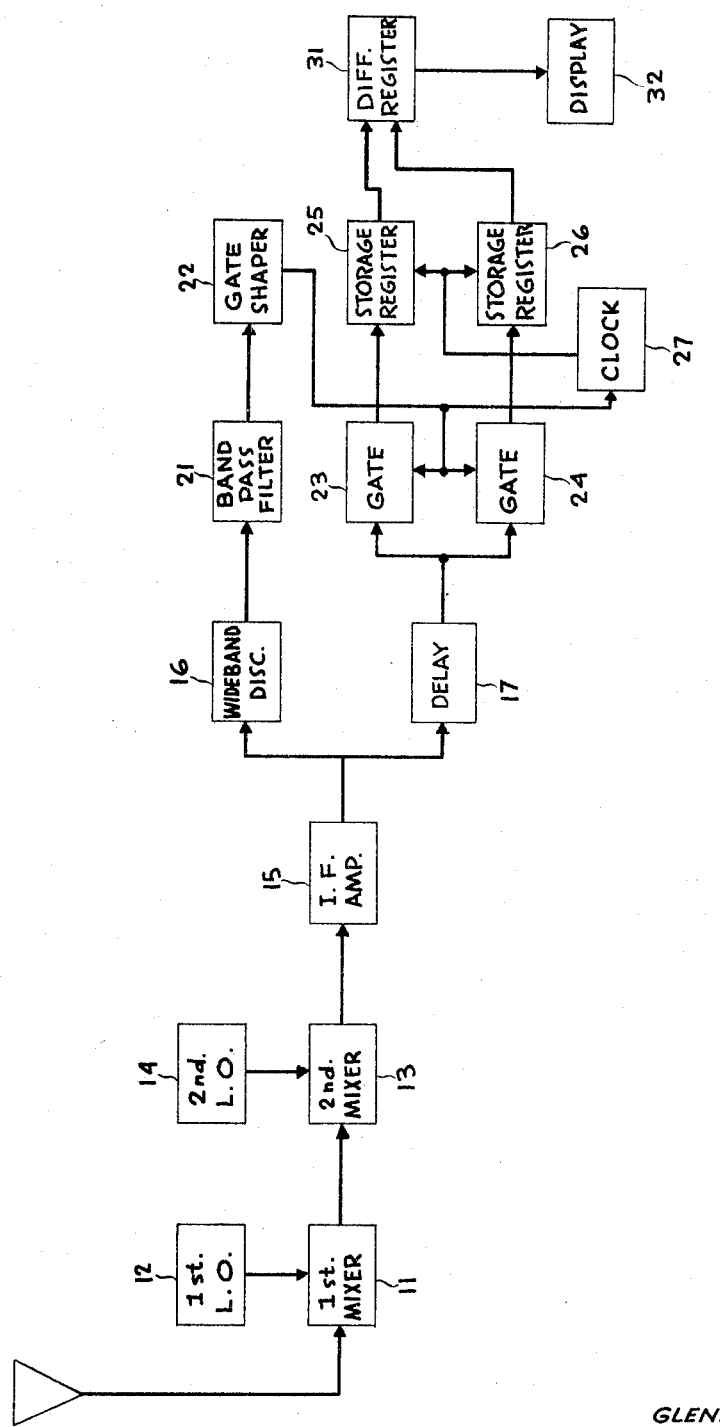

3,283,257
FM DEVIATION INDICATOR
Glenn D. Boyce, San Diego, Calif., assignor to General Dynamics Corporation, San Diego, Calif., a corporation of Delaware
Filed Aug. 21, 1963, Ser. No. 303,523
5 Claims. (Cl. 329—111)

This invention relates to measuring devices, and more particularly to a device for measuring the frequency deviation produced by the frequency modulation of a carrier wave.

The present invention is directed to a peak deviation measuring device, for use in circuits where the amplitude distribution of the modulating waveform is precisely known, wherein a pair of gates operated by an input signal switch the modulation signal between two storage registers. The gates are opened coincident with the zero crossings of the modulation signal waveform. The output from each gate is stored in an individual storage register for a predetermined period. At the end of the count period, the registers are read out into a difference register wherein the difference between the counts is displayed. By extracting the difference between the counts accumulated in the storage registers, the carrier is eliminated. Similarly, the selecting the proper counting time period, peak deviation may be read out directly from the difference register.

It is, therefore, an object of this invention to provide means for measuring the peak deviation of a frequency modulated carrier.

Another object of this invention is to provide a frequency modulation peak deviation measuring device providing a direct readout of peak deviation.

Another object of this invention is to provide a device for measuring the peak deviation of any single subcarrier of any FM-FM telemetry signal.

Another object of this invention is to provide a frequency modulation peak deviation measuring device which is inexpensive, reliable, and simple to operate while maintaining high operating speed and high accuracy.

These and other objects and advantages of the present invention will become apparent from the following specification and accompanying drawing, wherein the sole figure illustrates a diagram of an embodiment of the invention.

In general the present invention can accurately measure the average carrier frequency deviation and then with a knowledge of the amplitude distribution of the modulating function, a simple conversion is made in order to make the output reading indicative of the peak frequency deviation. The device can be used with any type of modulating function that provides a sinusoidal wave output such as in an FM-FM system. In the case of FM-FM systems the deviations produced by individual modulating components or subcarriers can be read separately.

Referring now to the drawings and its reference characters, the operation is as follows:

A frequency modulated signal is applied to a conventional double superhetrodyne receiver. The received carrier, at a frequency of, exemplarily, 220 megacycles, is reduced in frequency by a first mixer 11 and first local oscillator 12 to a first intermediate frequency of, exemplarily, 30 megacycles. The first intermediate frequency signal is applied to a second mixer 13 and associated local oscillator 14 wherein the first intermediate frequency signal is converted to a low frequency at, exemplarily, one megacycle.

An intermediate frequency amplifier 15 amplifies the one megacycle second intermediate frequency signal to a high level. The amplified second intermediate frequency signal is applied to a wide band discriminator 16 and to a delay line 17.

The discriminator 16, which can be any type of well known wide band discriminator, produces a voltage output that is proportional to the frequency of the incoming signal. Basically the discriminator provides a mode of operation where, in FM-FM telemetry systems the frequency deviation is measured of each component of the modulating signal.

Because the amplitude distribution of the received modulating waveform is known, the device can be used or made to read the peak deviation directly.

In the FM-FM systems the band pass filter 21 may comprise a plurality of parallel filters preceded by a selecting switch or the like, for selecting a desired modulating signal of interest.

The modulating signal of interest, exemplarily one subcarrier channel of an FM-FM telemetered signal, is selected by the filter 21. The signal selected by band pass filter 21 is applied to a gate signal shaping circuit 22. Gate signal shaping circuit 22 serves to convert the sinusoidal modulating signal from and pass filter 21 into a rectangular wave of the same frequency and crossing the zero axis at the same time. Exemplarily, a multi-vibrator circuit may be employed.

Delay line 17 delays the modulated carrier signal by a period of time equal to the time delay of the modulating signal by discriminator 16, band pass filter 21 and gate signal shaper 22. The delayed modulated carrier is applied simultaneously to gates 23 and 24. Similarly, the shaped modulating signal from gate shaper 22 is applied simultaneously to gates 23 and 24. Gate 23 is opened only when the shaped modulating signal is positive, and gate 24 is opened only when the shaped modulating signal is negative.

The signal from gate shaper 22 is also applied to clock 27. Clock 27 includes a precision time base oscillator of a type well known in the art. Clock 27 is started simultaneously with the application of the signal from gate shaper 22 to gates 23 and 24. The clock supplies a constant non-changing command signal which, when coincident with the start of an amplitude of the signal from the gate shaper 22, starts the basic count period for a certain determined time period. When the count period is completed an interval occurs and the following command signal starts, however the count period begins at a point coincident with the gate signal as mentioned above. For direct readout of the peak frequency deviation in the case of a sinusoidal modulating waveform, the count period is made $\pi/2$ seconds. It may be shown that the peak deviation $$D = \left| \sum_{i=0}^{.5\pi f} X_{Ai} - \sum_{i=0}^{.5\pi f} X_{Bi} \right|$$

$XA$=the count of zero crossings during the period the modulating signal is positive, $XB$=the count of zero crossings during the period the modulating signal is negative, and $f$ is the modulating signal in cycles per second. Storage register 25, connected to gate 23 and clock 27, performs the first summation in the equation disclosed hereinabove. Similarly, storage register 26, connected to gate 24 and clock 27, performs the second summation in the equation disclosed hereinabove.

Storage registers 25 and 26 may conveniently be binary registers of a type well known in the art. Storage registers 25 and 26 are stopped in time coincidence with gate shaper 22 output after proper time period to insure an integral number of modulating cycles. Difference register 31, connected to storage registers 25 and 26, determine the absolute difference between the counts present in storage register 25 and storage register 26. A suitable output or display device 32, which may conveniently be physically part of difference register 31, displays the numerical value of the difference, which, as disclosed hereinabove, is the numerical value of the peak deviation.

Since modifications and variations of the invention will occur to those skilled in the art, the embodiment disclosed is only exemplary, and the scope of the present invention is defined by the appended claims.

I claim:
1. A frequency modulation peak deviation measuring device responsive to a frequency modulated signal comprising a demodulator for recovering a modulating signal, a gate shaper responsive to a sinusoidal portion of said modulating signal being connected to said demodulator, inputs of first and second gate means connected to said gate shaper, means for applying said frequency modulated signal to said first and second gate means, first and second storage registers connected to said first and second gate means respectively, and a difference register connected to said first and second storage registers for obtaining the difference in count between said first and second storage registers.

2. A frequency modulation peak deviation measuring device responsive to a frequency modulated signal comprising a demodulator for recovering a modulating signal, a gate shaper responsive to a sinusoidal component of said modulating signal being connected to said demodulator, first and second gate means connected to said gate shaper, means for applying said frequency modulated signal to said first and second gate means, first and second storage registers connected to said first and second gate means respectively, timing means connected between said first and second storage register and said gate shaper, and a difference register connected to said first and second storage registers for obtaining the difference in count between said first and second storage registers.

3. A frequency modulation peak deviation measuring device responsive to a frequency modulated signal comprising a demodulator for recovering a modulating signal, a gate shaper responsive to a sinusoidal component of said modulating signal being connected to said demodulator, first and second gate means connected to said gate shaper, means for applying said frequency modulated signal to said first and second gate means, first and second storage registers connected to said first and second gate means respectively, timing means connected between said first and second storage registers and said gate shaper, a difference register connected to said first and second storage registers for obtaining the difference in count between said first and second storage registers, and a digital numerical display device connected with said difference register.

4. A frequency modulation peak deviation measuring device responsive to a frequency modulated signal comprising a demodulator and a band pass filter for recovering a modulating signal, a gate shaper responsive to a sinusoidal component of said modulating signal being connected to said demodulator, first and second gate means connected to said gate shaper, a delay line for applying said frequency modulated signal to said first and second gate means, first and second storage registers connected to said first and second gate means respectively, timing means connected to said first and second storage registers and said gate shaper, and a difference register connected to said first and second storage registers for obtaining the difference in count between said first and second storage registers, and digital numerical display device electrically connected with said difference register.

5. A frequency modulation peak deviation measuring device responsive to a frequency modulated signal comprising,
recovering means for recovering a modulated signal, said recovering means having gate shaper means,
first and second gate means connected to the output of said gate shaper means,
said gate shaper means in response to a substantially sinusoidal wave portion of said modulating signal being capable of alternatingly actuating said first and second gate means,
means for applying said frequency modulated signal to said gate means,
first and second storage registers connected to said first and second gate means respectively,
and a difference register connected to said first and second storage registers for obtaining the difference in count between said first and second storage registers.

References Cited by the Examiner
UNITED STATES PATENTS

| 2,466,804 | 4/1949 | Giffen et al. | 340—207 |
| 3,069,623 | 12/1962 | Murgio | 324—79 X |

HERMAN KARL SAALBACH, *Primary Examiner.*

P. L. GENSLER, *Assistant Examiner.*